(12) United States Patent
Tan (10) Patent No.: US 12,546,804 B2
(45) Date of Patent: Feb. 10, 2026

(54) REAL-EQUIVALENT-TIME OSCILLOSCOPE CLOCK DATA RECOVERY WITH SOFTWARE EQUALIZER

(71) Applicant: Tektronix, Inc., Beaverton, OR (US)

(72) Inventor: Kan Tan, Portland, OR (US)

(73) Assignee: TEKTRONIX, INC., Beaverton, OR (US)

( * ) Notice: Subject to any disclaimer, the term of this patent is extended or adjusted under 35 U.S.C. 154(b) by 178 days.

(21) Appl. No.: 18/442,359

(22) Filed: Feb. 15, 2024

(65) Prior Publication Data

US 2024/0393369 A1    Nov. 28, 2024

Related U.S. Application Data

(60) Provisional application No. 63/452,153, filed on Mar. 14, 2023.

(51) Int. Cl.
*G01R 13/02*    (2006.01)

(52) U.S. Cl.
CPC ....... *G01R 13/0218* (2013.01); *G01R 13/029* (2013.01)

(58) Field of Classification Search
CPC ............ G01R 13/0218; G01R 13/0272; G01R 13/029; G01R 19/2509; G01R 23/02; G01R 23/16; G01R 31/318594; G01R 31/31709; G01R 31/318555; G01R 31/318552; G01R 13/34; G01R 13/00; G01R 13/345; G01R 13/0254; G01R 31/31727; G06F 11/3636; G06F 11/36; G06F 7/544; G06F 9/30072; G06F 8/34; G06F 11/0751; G06F 11/00; G06F 15/0225

See application file for complete search history.

(56) References Cited

U.S. PATENT DOCUMENTS 10,075,286 B1 * 9/2018 Tan .................... G01R 13/02
10,476,704 B2 * 11/2019 Tan .................... G01R 13/029
11,789,051 B2 10/2023 Tan
2022/0334180 A1 * 10/2022 Pickerd ............. G01R 13/0254
2023/0070298 A1 * 3/2023 Tan .................... G01R 13/0272

* cited by examiner

*Primary Examiner* — Vinh P Nguyen
(74) *Attorney, Agent, or Firm* — Miller Nash LLP; Andrew J. Harrington (57) ABSTRACT

A test and measurement instrument has an input to receive a signal under test having a repeating pattern. one or more analog-to-digital converters (ADC) to sample the signal under test at a sample rate over many repeating patterns to digitize the signal, one or more processors configured to execute code to cause the one or more processors to: recover a clock from the sampled signal under test, use the clock to generate an original pattern waveform, interpolate and resample from the original pattern waveform to generate an evenly time-spaced pattern waveform, apply an equalizer to the evenly time-spaced pattern waveform to produce an equalized pattern waveform, interpolate and resample from the equalized pattern waveform to produce a new waveform having equalized samples at sample times of the sampled signal under test, recover an updated clock from the new waveform, and use the updated clock to produce an updated waveform.

17 Claims, 7 Drawing Sheets

REAL-EQUIVALENT-TIME OSCILLOSCOPE CLOCK DATA RECOVERY WITH SOFTWARE EQUALIZER

CROSS-REFERENCE TO RELATED APPLICATIONS

This disclosure is a non-provisional of and claims benefit from U.S. Provisional Application No. 63/452,153, titled "REAL-EQUIVALENT-TIME OSCILLOSCOPE CLOCK DATA RECOVERY WITH SOFTWARE EQUALIZER," filed on Mar. 14, 2023, the disclosure of which is incorporated herein by reference in its entirety.

TECHNICAL FIELD

This disclosure relates to test and measurement instruments, and more particularly to a real-equivalent-time (RET) oscilloscope.

DETAILED DESCRIPTION

The high-speed signaling progresses to higher speed for data centers, 5G and other applications. For example, 53 GBaud PAM4 signaling is used in 400 Gb Ethernet, 32 GBaud PAM4 signaling is used in PCIE Gen6. Future generations such as 800 Gb Ethernet and PCIE Gen7 will double the speed. For these applications, the high-end real-time (RT) oscilloscopes and the equivalent-time (ET) oscilloscopes are commonly used by R&D for debugging and characterization; the equivalent-time oscilloscopes are commonly used for volume productions. U.S. Pat. No. 11,789,051, "REAL-EQUIVALENT-TIME OSCILLOSCOPE," filed Feb. 22, 2021, and issued Oct. 17, 2023, hereinafter "Tan," the contents of which are hereby incorporated by reference into this disclosure, introduced a new type of test and measurement instrument called a real-equivalent-time (RET) oscilloscope. The RET oscilloscopes provide a cost-efficient and power-efficient way to address same measurement needs for the high-speed signaling.

The embodiments here involve an improved method for the software clock data recovery using software equalizers. The embodiments improve the accuracy of clock recovery for signals having more impairments by using the software equalizer to compensate the impairments. The RET oscilloscope acquired waveform suffers from aliasing because of the low ratio of RET oscilloscope sample rate over the signal symbol rate. Traditional software equalizers cannot be applied directly. In existing software clock data recovery (CDR) approaches such as that described in Tan, the process does not use the pattern waveform to improve the clock recovery accuracy. The embodiments here add additional steps to compensate for the signal impairments. The process accomplishes this by applying the software equalizer to the pattern waveform and adjusting the values of the RET samples. The process then runs the software CDR described in Tan again on adjusted samples to the updated recovered clock. Since the adjusted samples have less impairment, running CDR on the adjusted samples results in a more accurate updated recovered clock.

Figure 1:
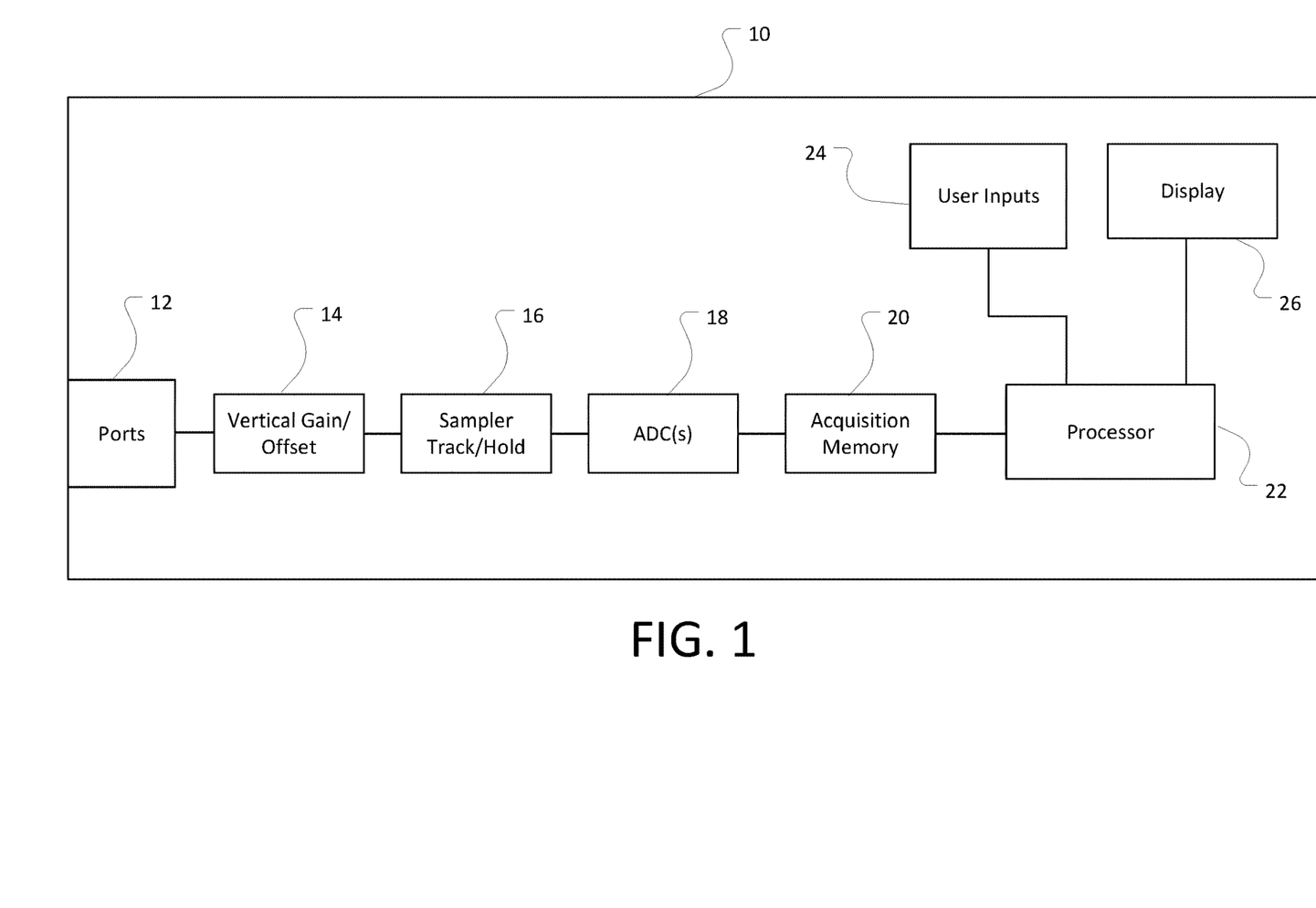
FIG. 1 shows an embodiment of a RET test and measurement instrument.

FIG. 1 shows a block diagram of a RET test and measurement instrument 10 according to some configurations of the disclosure. Test and measurement instrument 10 includes one or more ports 12 that may be any electrical or optical signaling medium. Ports 12 may include receivers, transmitters, and/or transceivers. Each port 12 may comprise a channel of the test and measurement instrument 10. The signals from the ports are then sent to a vertical offset 14 that can adjust the offset or baseline of the received signal. In some configurations or examples, the vertical offset 14 may also include a vertical gain adjustment. If there is no vertical gain adjustment, vertical noise can be reduced, but there is also a decrease in the dynamic range. To address this, in some examples, an external attenuator and/or amplifier may be used to attenuate and/or amplify the incoming signal under test. The vertical offset sends the signal to a sampler track and hold circuit 16. The track and hold circuit 16 holds each signal steady for a period of time sufficient to enable acquisition by the one or more high-resolution analog-to-digital converters (ADC) 18.

The ADC or ADCs 18 converts the analog signal from the track and hold circuit 16 to a digital signal. The ADCs 18 have a sampling rate greater than equivalent-time test and measurement instruments, but less than real-time test and measurement instruments. For example, the ADCs 18 can sample the signals from a few GS/s to tens of GS/s. In some configurations, the ADCs 18 can sample the analog signal between 1 GS/s to 100 GS/s. In other configurations, the ADCs can sample the analog signal between 2 GS/s and 25 GS/s. The digitized signal from the ADCs 18 can then be stored in an acquisition memory 20. That is, the sampling rate is set such that the Nyquist frequency, which is half the sampling rate, is lower than the analog bandwidth of the sampler Track/Hold 16. The ADCs 18 could be a single high-resolution ADCs, such as a 12-bit ADC.

The RET oscilloscope clock data recovery (CDR) is introduced in Tan. This document describes an improved method for the software clock data recovery using software equalizers. The method improves the accuracy of clock recovery for signals having more impairments by using the software equalizer to compensate the impairments. The RET oscilloscope acquired waveform is aliased because of the low ratio of RET oscilloscope's low sample rate over signal symbol rate. A traditional software equalizer cannot be applied directly. In the existing software CDR described in Tan, the pattern waveform is not used to improve the clock recovery accuracy. The new method adds additional steps to compensate the signal impairments by applying the software equalizer to the pattern waveform and adjusting the values of the RET samples and then running the software CDR described in Tan again on adjusted samples to the updated recovered clock. Since the adjusted samples have less impairment, the updated recovered clock is more accurate.

One or more processors 22 may be configured to execute instructions from memory and may perform any methods and/or associated steps indicated by such instructions, such as receiving the acquired signals from the acquisition memory 20 and reconstructing the signal under test without the use of a hardware trigger or acquiring the sample in the high acquisition rate. Memory 20 or any other memory on the test and mea-surement instrument 100 may be implemented as processor cache, random access memory (RAM), read only memory (ROM), solid state memory, hard disk drive(s), or any other memory type. Memory acts as a medium for storing data, computer program products, and other instructions.

User inputs 24 are coupled to the one or more processors 22. User inputs 24 may include a keyboard, mouse, trackball, touchscreen, and/or any other controls employable by a user to interact with a GUI on the display 26. The display 26 may be a digital screen, a cathode ray tube-based display, or any other monitor to display waveforms, mea-surements, and other data to a user. While the components of the test and measurement instrument 10 are depicted as being integrated within test and measurement instrument 10, it will be appreciated by a person of ordinary skill in the art that any of these components can be external to the test and mea-surement instrument 10 and can be coupled to the test and measurement instrument 10 in any conventional manner, such as wired and/or wireless communication media and/or mechanisms. For example, in some examples, the display 16 may be remote from the test and measurement instrument 10.

The power consumption of the instruments is one of the key aspects when the need grows for high counts of channel testing. The advances of silicon photonics enable higher channel counts and density for a single switch, in the order of hundreds of channels. To test the large number of channels, an instrument with higher channel counts can improve the test throughput.

Figure 2:
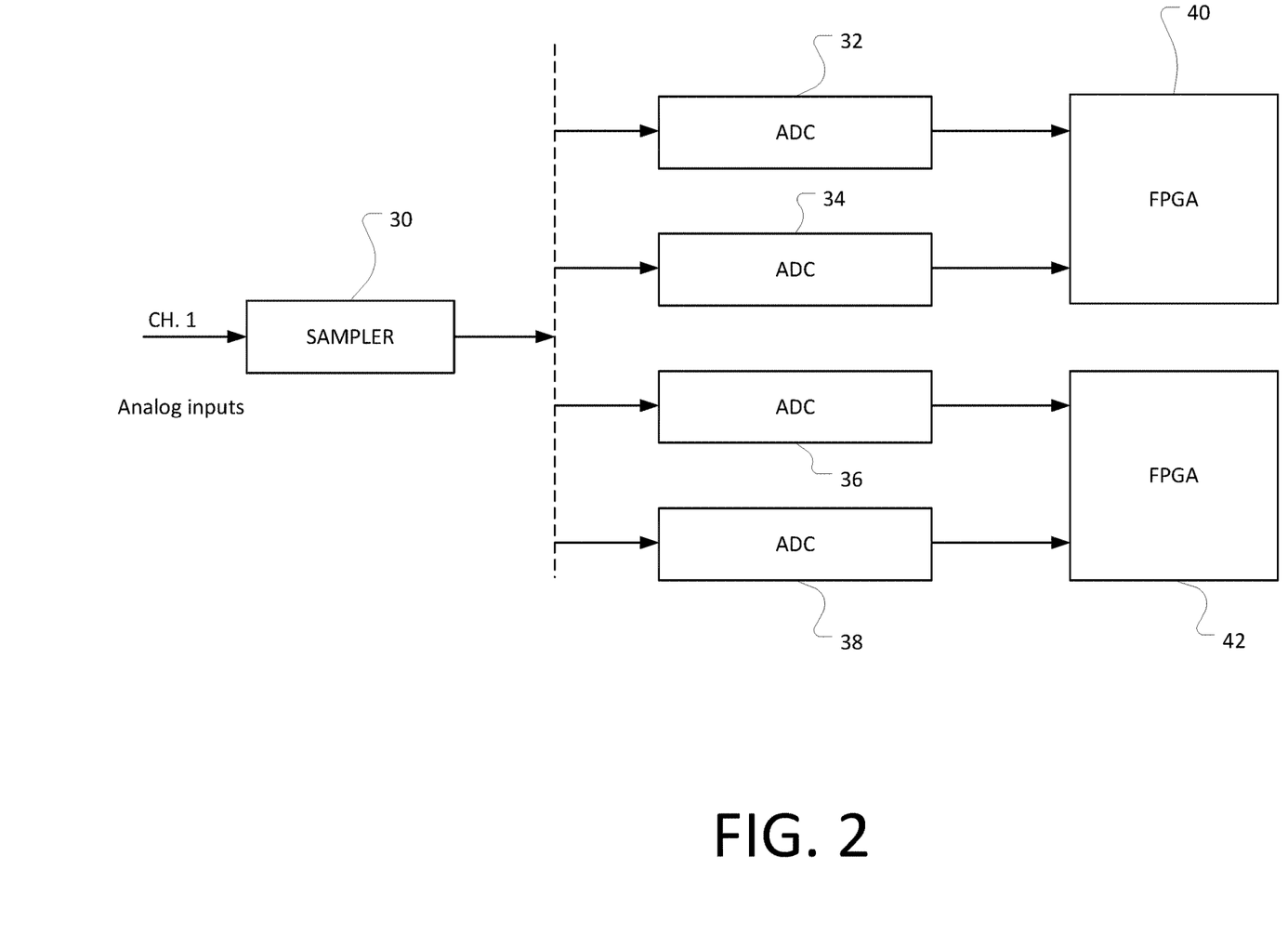
FIG. 2 shows an embodiment of a single analog channel of a real-time (RT) oscilloscope.

FIG. 2 shows an example of a test and measurement instrument, a real-time (RT) oscilloscope. An RT oscilloscope has a sample rate of more than twice of the analog bandwidth frequency for each analog channel. With the sample rate above the Nyquist frequency, the resulting patterns do not suffer from aliasing. For example, for a state-of-art RT oscilloscope each analog channel, such as Channel 1 shown, has a high-bandwidth 110 GHz sampler such as 30. Four ADCs, 32, 34, 36, and 38, support the sampler, each running at 62.5 Giga Samples per second (GS/s), to have a combined sample rate of 250 GS/s. Two processors, in this example field-programmable gate arrays (FPGA) 40 and 42, perform high speed sampled data management. For an N-channel real-time oscilloscope, N times of this channel configuration are built into the real-time oscilloscope. Each channel would have a structure like that shown in FIG. 2.

Figure 3:
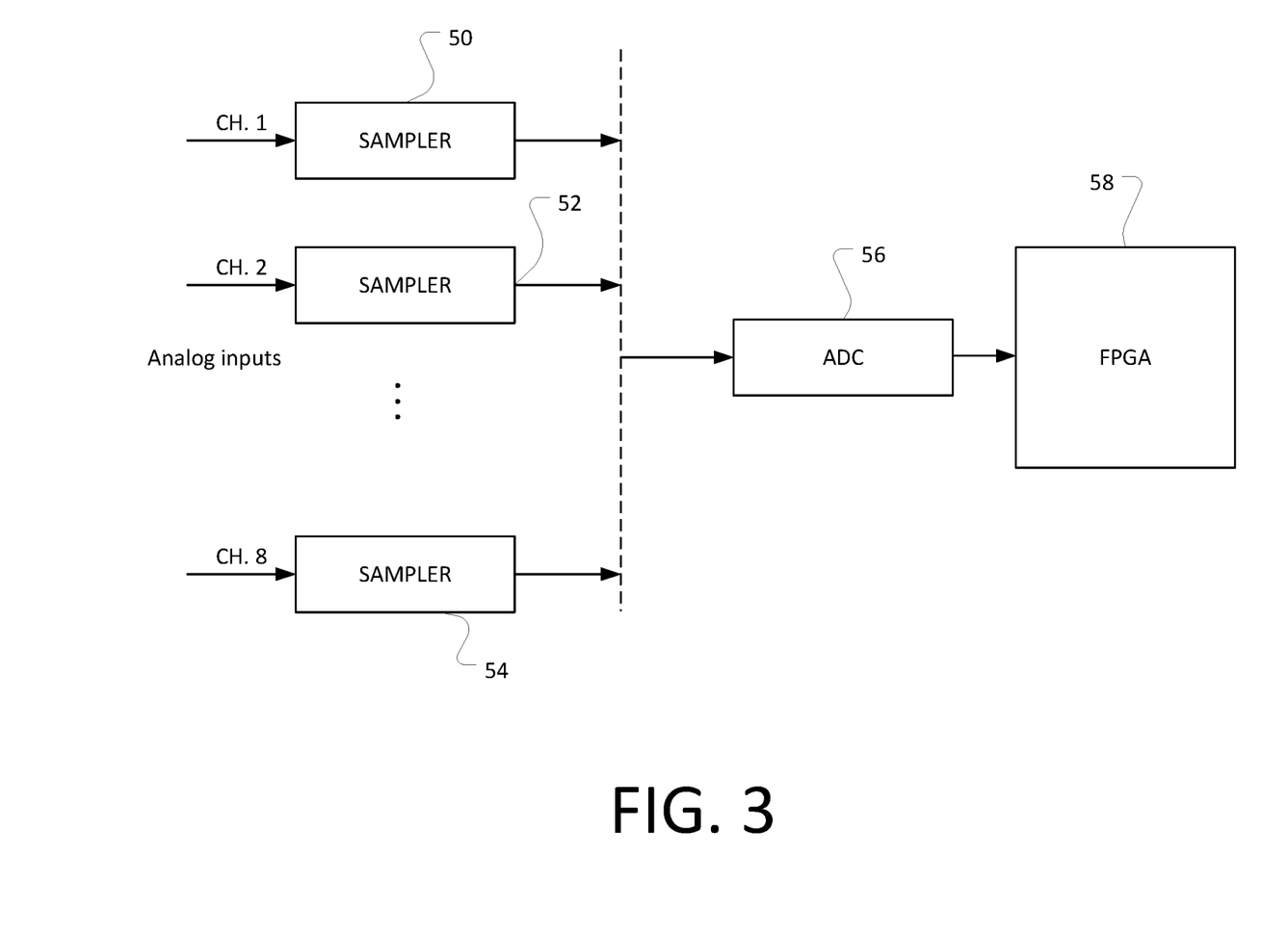
FIG. 3 shows an embodiment of a real-equivalent-time (RET) oscilloscope with eight analog channels.

In contrast, RET oscilloscopes have sample rates below twice of the analog bandwidth frequency, so the resulting waveforms generally have high aliasing. In some configurations, the RET oscilloscope requires the sample rate for each analog channel to be at least 2 GS/s per channel. The total sample rate of a single 62.5 GS/s ADC can support 8 channels. Each channel has sample rate of 7.8125 GS/s. FIG. 3 shows a configuration for an 8-channel RET oscilloscope.

As shown in FIG. 3, the RET oscilloscope has analog input channels 50, 52 and 54, representing 8 channels. The ADC 56 receives input from each of the input channels, managed under the processor, FPGA 58.

Table 1 has the power consumptions comparison between the RT oscilloscope and the RET oscilloscope with 4-channel, 8-channel, and 16-channel configurations. The RET oscilloscope can support higher oscilloscope channel count applications without significantly increasing power consumption.

TABLE 1

| Power consumption (Watt) | | | |
|---|---|---|---|
| Oscilloscope type | 4 channel scope | 8 channel scope | 16 channel scope |
| RT | 2700 | 5000 | 9500 |
| RET | 700 | 820 | 1060 |

Figure 4:
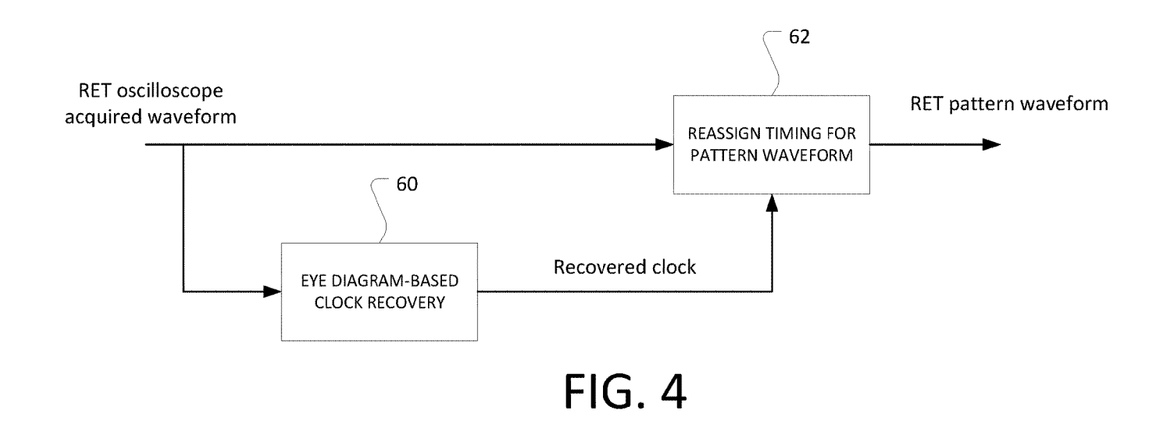
FIG. 4 shows a diagram of an embodiment of clock data recovery (CDR) in a RET test and measurement instrument.

The software clock recovery described in Tan, computes the recovered clock based on the eye diagram of the small segments over the waveform, then uses the recovered clock for each segment to generate the pattern waveform, as shown in FIG. 4.

In the clock recovery described by Tan, the RET oscilloscope acquires samples over segments of the incoming waveform and then recovers the clock at 60. The process then uses the samples to determine the frequency of the sampled signal under test. To determine the frequency of the sampled signal under test, the process may automatically generate an eye diagram and iteratively adjust a selected frequency of the signal under test until a horizontal opening of the eye diagram is at a widest point. Alternatively, the user may use the user interface 24 of FIG. 1 to input a selected frequency. The process then uses the determined frequency and sampling rate to recover the clock signal for the pattern waveform. Using the sample rate and the frequency, the process can recover the clock. Using the recovered clock, the process generates an original waveform.

The process then interpolates the original waveform to reassign timing for the samples of the waveform to make the samples locate at the right timing position of the pattern at 62. The pattern waveform can then be interpolated and resampled to have even timing spacing. The evenly spaced pattern waveform does not have aliasing.

When the eye diagram is nearly closed or completely closed, the clock recovery based on the eye diagram becomes less accurate because the dips in the standard deviation curve become less prominent. If the eye diagram becomes more opened, then the dips become more prominent, which yields more accurate clock recovery. The software equalizers, such as CTLE (continuous time linear equalizer), FFE (feed forward equalizer), and other software equalizers can open the eye diagram, but they do not work on a heavily aliased waveform. As discussed above, RET-acquired waveforms have heavy aliasing. The embodiments here provide un-aliased samples upon which the software equalizers can operate.

Figure 5:
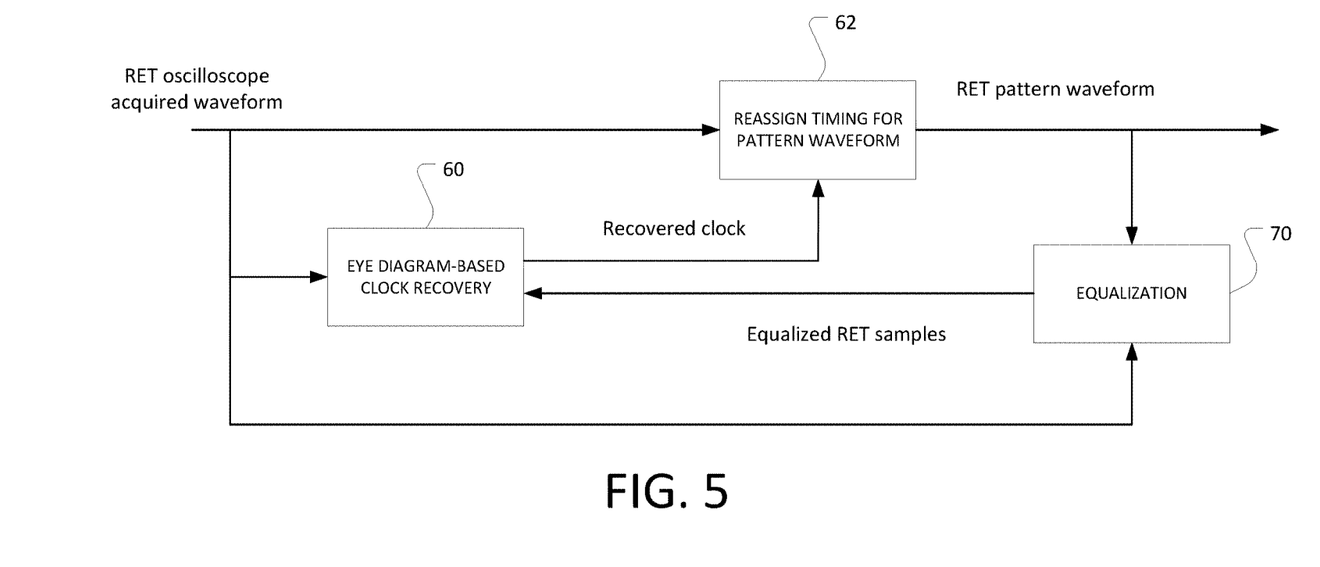
FIG. 5 shows a diagram of an embodiment of more accurate clock data recovery (CDR) with equalizer in a RET test and measurement instrument.

FIG. 5 shows an embodiment in which the clock recovery process uses equalization to provide adjusted values of the voltages of the samples. The process then uses the adjusted samples to recover a more accurate clock than using the first recovered clock. An embodiment of this process shown in FIG. 5 first recovers the clock as discussed above at 60. Using the recovered clock, the process generates a waveform from the samples. The process then uses this pattern waveform to interpolate and resample a new, evenly spaced waveform, by interpolating and resampling samples to new locations on the waveform to space them evenly at 62. This waveform does not have aliasing.

The process then applies equalization to the evenly spaced pattern waveform, also referred to as the RET pattern waveform, at 70. The process finds a software equalizer such as an FFE for the evenly spaced pattern waveform. The equalizer compensates the pattern waveform impairments. After equalization at 70, the equalized pattern waveform has larger eye opening than the un-equalized pattern waveform. The equalized pattern waveform maintains the even spacing.

The process then interpolates from the equalized pattern waveform to produce the equalized samples at the sample times of the original pattern waveform to produce a "new waveform." The process maps between the sample time of the original pattern waveform, the RET oscilloscope acquired waveform, and then tracks the time of the pattern waveform from the original clock recovery to the equalization process of 70.

The "new waveform," meaning the equalized waveform having samples at same time of the original RET oscilloscope acquired waveform, then becomes the new input waveform to go through clock recovery to get an updated recovered clock. This updated recovered clock has improved accuracy.

The process applies the updated recovered clock of each segment to the original RET oscilloscope acquired waveform to generate the updated pattern waveform as described in Tan and discussed above. The discussion will refer to this as the "updated waveform" to differentiate it from the new waveform above. Note that this process can continue from the clock recovery to the updated waveform through multiple iterations to further improve the clock-data-recovery (CDR) accuracy.

Figure 6:
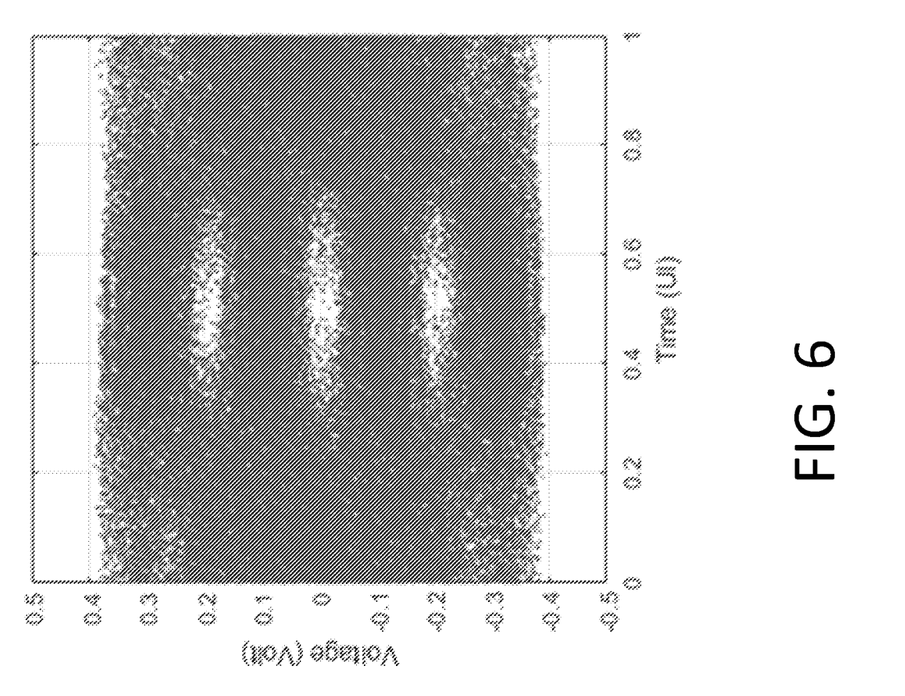
FIG. 6 shows an eye diagram on an RET oscilloscope after software clock recovery without assistance of a feed forward equalizer (FFE).
Figure 7:
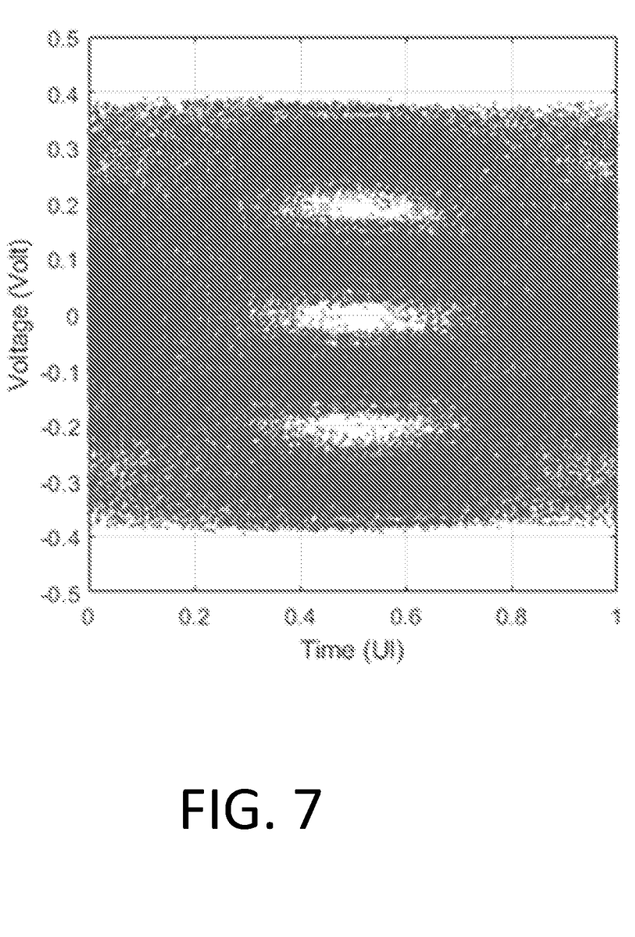
FIG. 7 shows an eye diagram on an RET oscilloscope after software clock recovery with assistance of an FFE.
Figure 8:
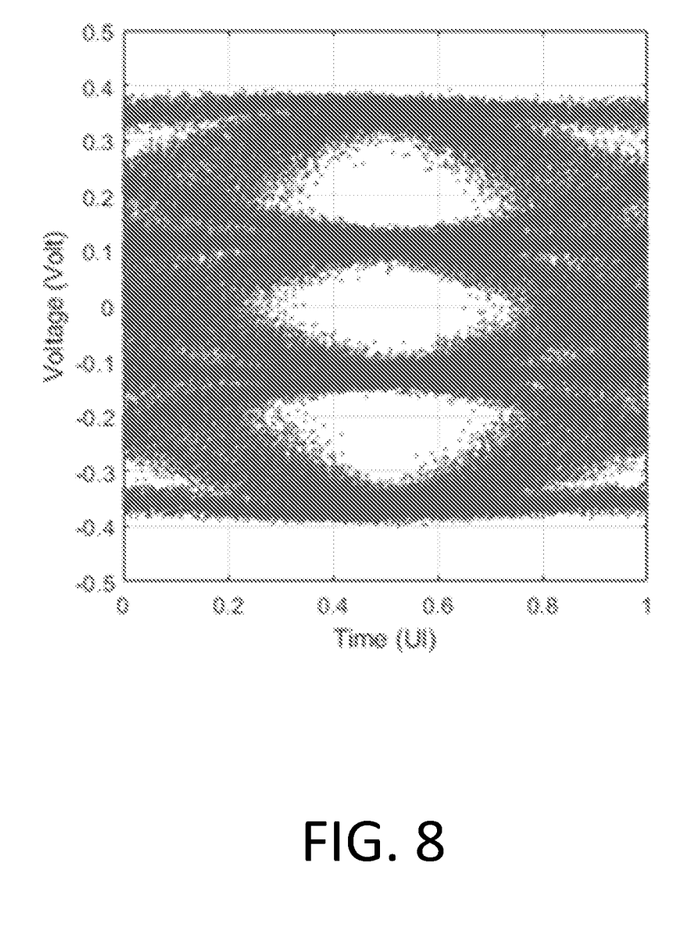
FIG. 8 shows an eye diagram of a FFE equalized waveform.

FIGS. 6 through 8 show an example of a progression of an eye diagram through the various parts of the process. FIG. 6 shows the eye diagram if using the method described in Tan. FIG. 7 shows the eye diagram using the improved RET software clock recovery with assistant of a software equalizer. This embodiment uses an FFE as the equalizer. The eye diagram in FIG. 7 has a wider eye opening than the eye diagram in FIG. 6. The vertical values of the samples are identical in FIGS. 6 and 7. The improved clock recovery accuracy helps to yield wider eye openings. For high-speed signal measurement, the clock recovery accuracy is a key figure. FIG. 8 shows the eye diagram of the equalized waveform from the process above. This has a larger eye opening than FIG. 7 since the waveform for FIG. 8 has undergone equalization and has much less impairment caused by inter-symbol-interference (ISI). In this manner, a more accurate clock provides more accurate waveforms for ultimately more accurate test results.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 is a test and measurement instrument comprising: an input configured to receive a signal under test having a repeating pattern; one or more analog-to-digital converters (ADC) to sample the signal under test at a sample rate over a plurality of repeating patterns to digitize the signal to produce a sampled signal under test; one or more processors configured to execute code to cause the one or more processors to: recover a clock from the sampled signal under test; use the clock to generate an original pattern waveform; interpolate and resample from the original pattern waveform to generate an evenly time-spaced pattern waveform using the clock; apply an equalizer to the evenly time-spaced pattern waveform to produce an equalized pattern waveform; interpolate and resample from the equalized pattern waveform to produce a new waveform having equalized samples at sample times of the sampled signal under test; recover an updated clock from the new waveform; and use the updated clock to produce an updated waveform.

Example 2 is the test and measurement instrument of Example 1, wherein the code that causes the one or more processors to recover the clock comprises code to cause the one or more processors to: determine a frequency of the sampled signal under test; and use the determined frequency and sampling rate to recover the clock for the pattern waveform.

Example 3 is the test and measurement instrument of Example 2, wherein the code that causes the one or more processors to determine a frequency of the sampled signal under test causes the one or more processors to automatically generate an eye diagram and iteratively adjust a selected frequency of the signal under test until a horizontal opening of the eye diagram is at a widest point.

Example 4 is the test and measurement instrument of any of Examples 1 through 3 claim 1, wherein the code that causes the one or more processors to apply an equalizer comprises code that causes the one or more processors to apply one of a feed-forward equalizer (FFE), a continuous time linear equalizer (CTLE), or other software equalizer.

Example 5 is the test and measurement instrument of any of Examples 1 through 4 claim 1, wherein the one or more ADCs comprises one ADC.

Example 6 is the test and measurement instrument of Example 5, wherein the one ADC is coupled to 8 input channels, each channel having an input configured to receive a signal under test having a repeating pattern.

Example 7 is the test and measurement instrument of any of Examples 1 through 6 claim 1, wherein the sample rate is at least 2 Giga Samples per second.

Example 8 is the test and measurement instrument of any of Examples 1 through 7 claim 1, wherein the one or more processors are further configured to repeatedly execute the code that causes the one or more processors to recover the clock, use the clock, interpolate and resample the pattern waveform, apply an equalizer, interpolate and resample from the equalized pattern waveform, recover the updated clock, and use the updated clock, until a desired accuracy for the updated clock is achieved.

Example 9 is a method, comprising: receiving a signal under test; sampling the signal under test to product a sampled signal under test; recovering a clock from the sampled signal under test; using the clock to generate an original pattern waveform; interpolating and resampling from the original pattern waveform to generate an evenly time-spaced pattern waveform using the clock; applying an equalizer to the evenly time-spaced pattern waveform to produce an equalized pattern waveform; interpolating and resampling using the equalized pattern waveform to produce a new waveform having equalized samples at sample times of the sampled signal under test; recovering an updated clock from the new waveform; and using the updated clock to produce an updated waveform.

Example 10 is the method of Example 9, the wherein recovering the clock comprises: determining a frequency of the sampled signal under test; and using the determined frequency and sampling rate to recover the clock for the pattern waveform.

Example 11 is the method of Example 10, wherein determining the frequency of the sampled signal under test comprises automatically generating an eye diagram and iteratively adjusting a selected frequency of the signal under test until a horizontal opening of the eye diagram is at a widest point.

Example 12 is the method of any of Examples 9 through 11, wherein applying the equalizer comprises applying one of a feed-forward equalizer (FFE), a continuous time linear equalizer (CTLE), or other software equalizer.

Example 13 is the method of any of Examples 9 through 12, wherein sampling the signal under test comprises sampling the signal under test by one or more ADCs.

Example 14 is the method of Example 13, wherein sampling the signal under test comprises sampling the signal under test with one ADC.

Example 15 is the method of Example 14, wherein the one ADC is coupled to 8 input channels, each channel having an input configured to receive a signal under test having a repeating pattern.

Example 16 is the method of any of Examples 9 through 15, wherein the sample rate is at least 2 Giga Samples per second.

Example 17 is the method of any of Examples 9 through 16, further comprising repeatedly recovering the clock, using the clock, interpolating and resampling the pattern waveform, applying the equalizer, interpolating and resampling from the equalized pattern waveform, recovering the updated clock, and using the updated clock, until a desired accuracy for the updated clock is achieved.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific examples of the invention have been illustrated and described for purposes of illustration, it will be understood that various modifications may be made without departing from the spirit and scope of the invention. Accordingly, the invention should not be limited except as by the appended claims.

What is claimed is:
1. A test and measurement instrument comprising:
 an input configured to receive a signal under test having a repeating pattern;

one or more analog-to-digital converters (ADC) to sample the signal under test at a sample rate over a plurality of repeating patterns to digitize the signal to produce a sampled signal under test;

one or more processors configured to execute code to cause the one or more processors to:
recover a clock from the sampled signal under test;
use the clock to generate an original pattern waveform;
interpolate and resample from the original pattern waveform to generate an evenly time-spaced pattern waveform using the clock;
apply an equalizer to the evenly time-spaced pattern waveform to produce an equalized pattern waveform;
interpolate and resample from the equalized pattern waveform to produce a new waveform having equalized samples at sample times of the sampled signal under test;
recover an updated clock from the new waveform; and
use the updated clock to produce an updated waveform.

2. The test and measurement instrument as claimed in claim 1, wherein the code that causes the one or more processors to recover the clock comprises code to cause the one or more processors to:
determine a frequency of the sampled signal under test; and
use the determined frequency and sampling rate to recover the clock for the pattern waveform.

3. The test and measurement instrument as claimed in claim 2, wherein the code that causes the one or more processors to determine a frequency of the sampled signal under test causes the one or more processors to automatically generate an eye diagram and iteratively adjust a selected frequency of the signal under test until a horizontal opening of the eye diagram is at a widest point.

4. The test and measurement instrument as claimed in claim 1, wherein the code that causes the one or more processors to apply an equalizer comprises code that causes the one or more processors to apply one of a feed-forward equalizer (FFE), a continuous time linear equalizer (CTLE), or other software equalizer.

5. The test and measurement instrument as claimed in claim 1, wherein the one or more ADCs comprises one ADC.

6. The test and measurement instrument as claimed in claim 5, wherein the one ADC is coupled to 8 input channels, each channel having an input configured to receive a signal under test having a repeating pattern.

7. The test and measurement instrument as claimed in claim 1, wherein the sample rate is at least 2 Giga Samples per second.

8. The test and measurement instrument as claimed in claim 1, wherein the one or more processors are further configured to repeatedly execute the code that causes the one or more processors to recover the clock, use the clock, interpolate and resample the pattern waveform, apply an equalizer, interpolate and resample from the equalized pattern waveform, recover the updated clock, and use the updated clock, until a desired accuracy for the updated clock is achieved.

9. A method, comprising:
receiving a signal under test;
sampling the signal under test to product a sampled signal under test;
recovering a clock from the sampled signal under test;
using the clock to generate an original pattern waveform;
interpolating and resampling from the original pattern waveform to generate an evenly time-spaced pattern waveform using the clock;
applying an equalizer to the evenly time-spaced pattern waveform to produce an equalized pattern waveform;
interpolating and resampling using the equalized pattern waveform to produce a new waveform having equalized samples at sample times of the sampled signal under test;
recovering an updated clock from the new waveform; and
using the updated clock to produce an updated waveform.

10. The method as claimed in claim 9, the wherein recovering the clock comprises:
determining a frequency of the sampled signal under test; and
using the determined frequency and sampling rate to recover the clock for the pattern waveform.

11. The method as claimed in claim 10, wherein determining the frequency of the sampled signal under test comprises automatically generating an eye diagram and iteratively adjusting a selected frequency of the signal under test until a horizontal opening of the eye diagram is at a widest point.

12. The method as claimed in claim 9, wherein applying the equalizer comprises applying one of a feed-forward equalizer (FFE), a continuous time linear equalizer (CTLE), or other software equalizer.

13. The method as claimed in claim 9, wherein sampling the signal under test comprises sampling the signal under test by one or more ADCs.

14. The method as claimed in claim 13, wherein sampling the signal under test comprises sampling the signal under test with one ADC.

15. The method as claimed in claim 14, wherein the one ADC is coupled to 8 input channels, each channel having an input configured to receive a signal under test having a repeating pattern.

16. The method as claimed in claim 9, wherein the sample rate is at least 2 Giga Samples per second.

17. The method as claimed in claim 9, further comprising repeatedly recovering the clock, using the clock, interpolating, and resampling the pattern waveform, applying the equalizer, interpolating and resampling from the equalized pattern waveform, recovering the updated clock, and using the updated clock, until a desired accuracy for the updated clock is achieved.

* * * * *